(12) United States Patent
Jette (10) Patent No.: US 9,074,707 B2
(45) Date of Patent: Jul. 7, 2015

(54) FLEXIBLE CABLE MANAGEMENT SYSTEM

(71) Applicant: Roger Jette, West Islip, NY (US)

(72) Inventor: Roger Jette, West Islip, NY (US)

( * ) Notice: Subject to any disclaimer, the term of this patent is extended or adjusted under 35 U.S.C. 154(b) by 21 days.

(21) Appl. No.: 14/310,155

(22) Filed: Jun. 20, 2014

(65) Prior Publication Data

US 2014/0299716 A1 Oct. 9, 2014

Related U.S. Application Data

(62) Division of application No. 12/732,444, filed on Mar. 26, 2010, now Pat. No. 8,783,628.

(51) Int. Cl.
| | |
|---|---|
| *F16L 3/00* | (2006.01) |
| *F16L 3/26* | (2006.01) |
| *H02G 3/04* | (2006.01) |
| *F16L 3/22* | (2006.01) |

(52) U.S. Cl.
CPC ................ *F16L 3/26* (2013.01); *H02G 3/0443* (2013.01); *F16L 3/221* (2013.01)

(58) Field of Classification Search
USPC .......................... 248/49, 58, 60, 61, 65, 68.1
See application file for complete search history.

(56) References Cited

U.S. PATENT DOCUMENTS

| | | |
|---|---|---|
| 573,835 A | 12/1896 | Taylor |
| 1,421,705 A | 7/1922 | Melish |
| 1,590,910 A | 6/1926 | Rumrill |
| 1,681,418 A | 8/1928 | Livesay |
| 2,149,821 A | 3/1939 | Sutherland |
| 2,191,693 A | 2/1940 | Havlis |
| 2,620,074 A | 12/1952 | Moore |
| 2,891,750 A | 6/1959 | Bergquist |
| 3,363,048 A | 1/1968 | Vaughn |
| 3,752,352 A | 8/1973 | Senecal |
| 3,817,395 A | 6/1974 | LeFever |
| 3,951,270 A | 4/1976 | Kiss |
| 3,960,350 A | 6/1976 | Tardoskegyi |
| 4,162,730 A | 7/1979 | Steere, Jr. et al. |
| 4,429,797 A | 2/1984 | Collins |
| 4,456,125 A | 6/1984 | Chap |
| 4,765,495 A | 8/1988 | Bisk |
| 4,781,255 A | 11/1988 | Lock et al. |
| 5,100,008 A | 3/1992 | O'Herron |
| 5,169,010 A | 12/1992 | Fortner |
| 5,384,937 A | 1/1995 | Simon |
| 5,423,437 A | 6/1995 | Kayem |
| 5,460,279 A | 10/1995 | Emery et al. |
| 5,460,280 A | 10/1995 | Feddeler |
| 5,531,410 A | 7/1996 | Simon |
| 5,586,413 A | 12/1996 | Sharon |
| 5,727,700 A | 3/1998 | Digney |
| 5,775,209 A | 7/1998 | Tiemann |
| 5,836,460 A | 11/1998 | Brown et al. |
| 5,839,702 A | 11/1998 | Jette |
| 5,868,361 A * | 2/1999 | Rinderer .................. 248/58 |
| 5,875,902 A | 3/1999 | Emery et al. |
| 5,893,539 A | 4/1999 | Tran et al. |

(Continued)

*Primary Examiner* — Steven Marsh
(74) *Attorney, Agent, or Firm* — Carter DeLuca Farrell & Schmidt LLP (57) ABSTRACT

A cable support apparatus is provided. The cable support apparatus includes an elongate spine member, and a plurality of support members each attached to the elongate spine member, each of the plurality of support members defining at least one cable receiving portion therein, wherein at least one of the plurality of support members further includes a hanger for retaining one or more cables separate from the at least one cable receiving portion.

11 Claims, 7 Drawing Sheets

(56) References Cited

U.S. PATENT DOCUMENTS

| | | | |
|---|---|---|---|
| 5,921,511 A | 7/1999 | LaPointe | |
| 5,927,658 A | 7/1999 | Gerster | |
| 5,996,948 A | 12/1999 | Skvorecz | |
| 6,019,323 A | 2/2000 | Jette | |
| 6,023,024 A | 2/2000 | Stjerneby | |
| 6,061,884 A | 5/2000 | Ohms et al. | |
| 6,109,462 A | 8/2000 | Emalfarb et al. | |
| 6,138,961 A | 10/2000 | Zweig | |
| 6,140,584 A | 10/2000 | Baldissara et al. | |
| 6,193,434 B1 | 2/2001 | Durin et al. | |
| 6,239,364 B1 | 5/2001 | Nickel | |
| 6,286,691 B1 | 9/2001 | Oberhaus et al. | |
| 6,311,732 B1 | 11/2001 | Nickel | |
| 6,341,704 B1 | 1/2002 | Michel, Jr. | |
| 6,361,000 B1 | 3/2002 | Jette | |
| 6,364,255 B1 | 4/2002 | Carrick et al. | |
| 6,401,939 B1 | 6/2002 | Durin | |
| 6,402,418 B1 | 6/2002 | Durin et al. | |
| 6,409,031 B1 | 6/2002 | Wynne | |
| 6,427,400 B1 | 8/2002 | Greenblatt | |
| 6,431,375 B2 | 8/2002 | Spencer | |
| 6,460,812 B1 | 10/2002 | Jette | |
| 6,483,025 B1 | 11/2002 | Samsi et al. | |
| 6,494,340 B1 | 12/2002 | Joo | |
| 6,590,154 B1 | 7/2003 | Badey et al. | |
| 6,595,120 B1 | 7/2003 | Tiemann | |
| 6,637,704 B2 | 10/2003 | Jette | |
| 6,688,478 B2 | 2/2004 | Miller, Jr. et al. | |
| 6,926,236 B2 * | 8/2005 | Jette | 248/68.1 |
| 7,476,801 B1 | 1/2009 | Davis et al. | |
| 7,544,895 B2 | 6/2009 | Penichon | |
| 7,546,987 B2 | 6/2009 | Sinkoff | |
| 7,578,486 B1 | 8/2009 | Taylor | |
| 7,597,203 B2 | 10/2009 | Jasniy | |
| 7,757,996 B2 | 7/2010 | Jacobs | |
| 8,177,172 B2 * | 5/2012 | Quertelet et al. | 248/68.1 |
| 2001/0007341 A1 | 7/2001 | Jette | |
| 2002/0023888 A1 | 2/2002 | Wynne et al. | |
| 2002/0030143 A1 | 3/2002 | Jette | |
| 2007/0119805 A1 | 5/2007 | Nawrocki | |

\* cited by examiner

FLEXIBLE CABLE MANAGEMENT SYSTEM

CROSS-REFERENCE TO RELATED APPLICATIONS

This application is a divisional application of U.S. patent application Ser. No. 12/732,444, filed on Mar. 26, 2010, the entire contents of which are hereby incorporated herein by reference.

BACKGROUND

1. Technical Field

The present disclosure relates to cable management systems and more particularly to cable management systems for cable management and installation applications.

2. Description of Related Art

With the increasing volume of communication and data cables being incorporated into buildings cable management systems are becoming more and more critical. Previous cable management systems utilized rigid box trays or ladders which required a high degree of labor and components to perform even a simple installation. The amount of labor and additional components significantly increased when attempting an installation which required routing the cable tray around obstacles such as ductwork, plumbing or other building systems.

Known cable management systems are configured to maintain communication and data cables. Commonly owned U.S. Pat. No. 6,361,000, which is incorporated herein by reference in its entirety, discloses multiple cable management systems for supporting one or more cables. In these systems, the cables are retained in bundles; however, bundling of the cables may cause interference with transmission through the cables. This is especially true of cables transmitting at radio frequencies (RF).

Accordingly, a need exists for cable management systems which is configured to maintain one or more cables separate from the cable bundle.

SUMMARY

A cable support apparatus is provided. The apparatus includes an elongate spine member and a plurality of support members each attached to the elongate spine member. Each of the plurality of support members defines at least one cable receiving portion. At least one of the plurality of support members further includes a hanger for retaining one or more cables separate from the at least one cable receiving portion. The plurality of support members may be positioned relative one another to permit substantial bending of the elongate spine member. The plurality of support members may include a mounting terminal formed as a loop adapted to receive mounting hardware therein. The plurality of support members may define an opening in communication with the at least one cable receiving portion, the opening being disposed a vertical distance away from the elongate spine member to permit loading or unloading of cables on the cable support apparatus when the cable support apparatus is mounted relative to a base. The plurality of support members may be attached to the flexible spine member such that the elongate spine member is maintained at a predetermined distance away from the at least one cable receiving portion of each of the plurality of support members. The support members may further be attached to the elongate spine member at at least two points along the length of thereof.

The support members including a hanger may be equally spaced from the support members without a hanger. The hanger may be configured to maintain at least one cable a predetermined distance from the cable receiving portion. The hanger may be disposed in substantial vertical alignment with the center of gravity of the cable support apparatus.

Also disclosed is a cable support apparatus. The cable support apparatus includes an elongate flexible spine member, a plurality of support members attached to the elongate flexible spine member, the plurality of support members each defining a partially enclosed area configured and dimensioned to receive a plurality of cables therein, the plurality of support members further including a hanger configured to suspend the support member from a support structure. The plurality of support members may be positioned relative to one another to permit substantial bending, by hand, of the elongate spine member. The hanger may be disposed in substantial vertical alignment with a center of gravity of the cable support apparatus.

The plurality of support members may be attached to the flexible spine member such that an opening is defined which provides access to the at least one enclosed area, the opening being disposed a vertical distance away from the flexible spine member to permit loading or unloading of cables on the cable support apparatus when the cable support apparatus is suspended from a support structure. Additionally, the plurality of support members may be attached to the flexible spine member such that the flexible spine member is maintained at a predetermined distance away from the at least one area of each of the plurality of support members.

BRIEF DESCRIPTION OF THE DRAWINGS

For a better understanding of the invention, reference is made to the following description of exemplary embodiments thereof, and to the accompanying drawing figures, wherein.

DETAILED DESCRIPTION OF THE EMBODIMENTS

Figures 1, 2:
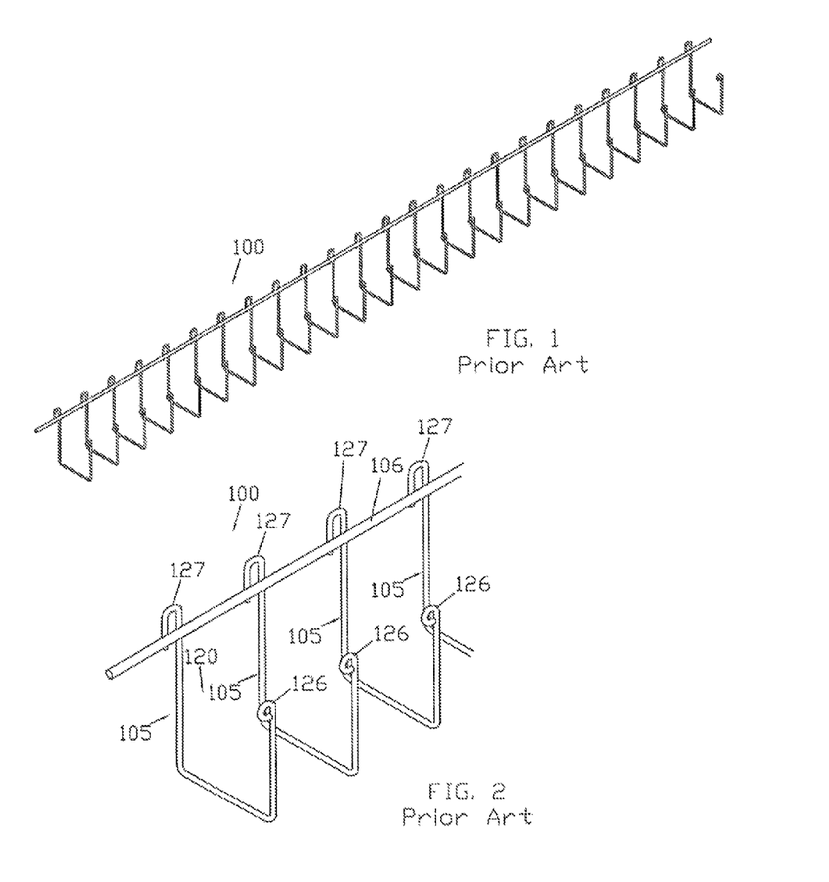
FIG. 1 is a perspective view of a known cable management system.
FIG. 2 is an enlarged sectional view of the cable management system of FIG. 1.

Referring initially to FIGS. 1 and 2, a known cable management system is shown generally as cable tray 100. Cable tray 100 is preferably constructed of wire stock and includes a flexible spine 106 and multiple cable support members 105. Spine 106 runs along the length of cable tray 100 with cable support members 105 extending from spine 106. Cable support members 105 are formed by bending the wire stock to form cable receiving portion 120. Although receiving portions 120 are shown generally as being rectangular, it is understood, that other geometric configurations may also be utilized.

Still referring to FIGS. 1 and 2, cable support members 105 include mounting loops 127 and looped ends 126. Mounting loops 127 are formed as u-shaped horizontal terminal ends at the upper terminus of the inboard vertical leg of receiving portions 120 of cable support members 105. In this manner, a double attachment point is established for each cable support member 105 with respect to flexible central spine 106, thereby greatly reducing moment forces which could otherwise potentially be created in the longitudinal direction of spine 106 at the connection and providing greater stability and strength for each connection. Spine 106 may be attached to mounting loops 127 by any suitable known methods, for example, welding. Mounting loops 127 are configured and dimensioned to receive mounting hardware, for example, a threaded bolt and nut combination. This eliminates the need for additional separate mounting brackets or the like which would otherwise have to be attached to cable tray 100 in order to mount it to the overhead structure of the building. Looped ends 126 are formed on the outboard vertical leg of cable supports 105, and as shown, are formed outwardly. Looped ends 126 may instead be reversed and formed inwardly in order to provide a retention feature.

Although the aspects of the present disclosure will now be described with respect to the embodiments disclosed, it is envisioned that these aspects may be modified for use with other cable management systems, including those found in commonly owned U.S. Pat. No. 6,361,000, the contents of which were previously incorporated by reference in their entirety.

Figure 3:
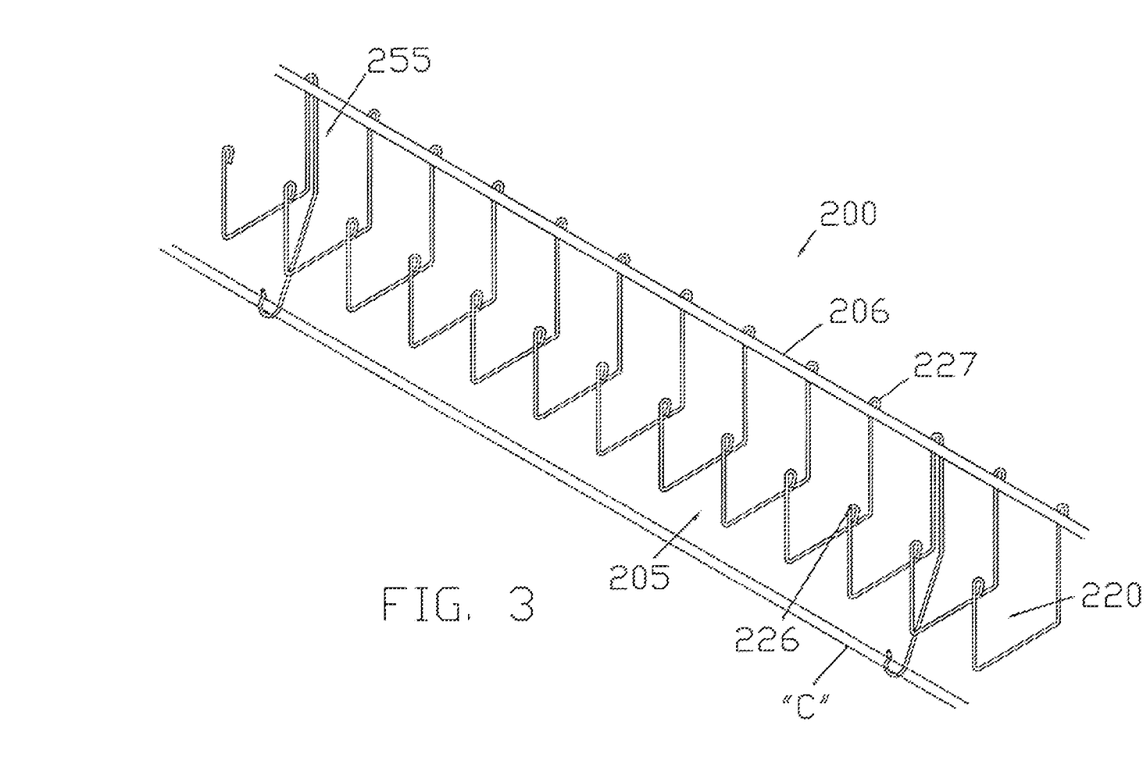
FIG. 3 is a perspective view of a cable management system according to an embodiment of the present disclosure.
Figure 4:
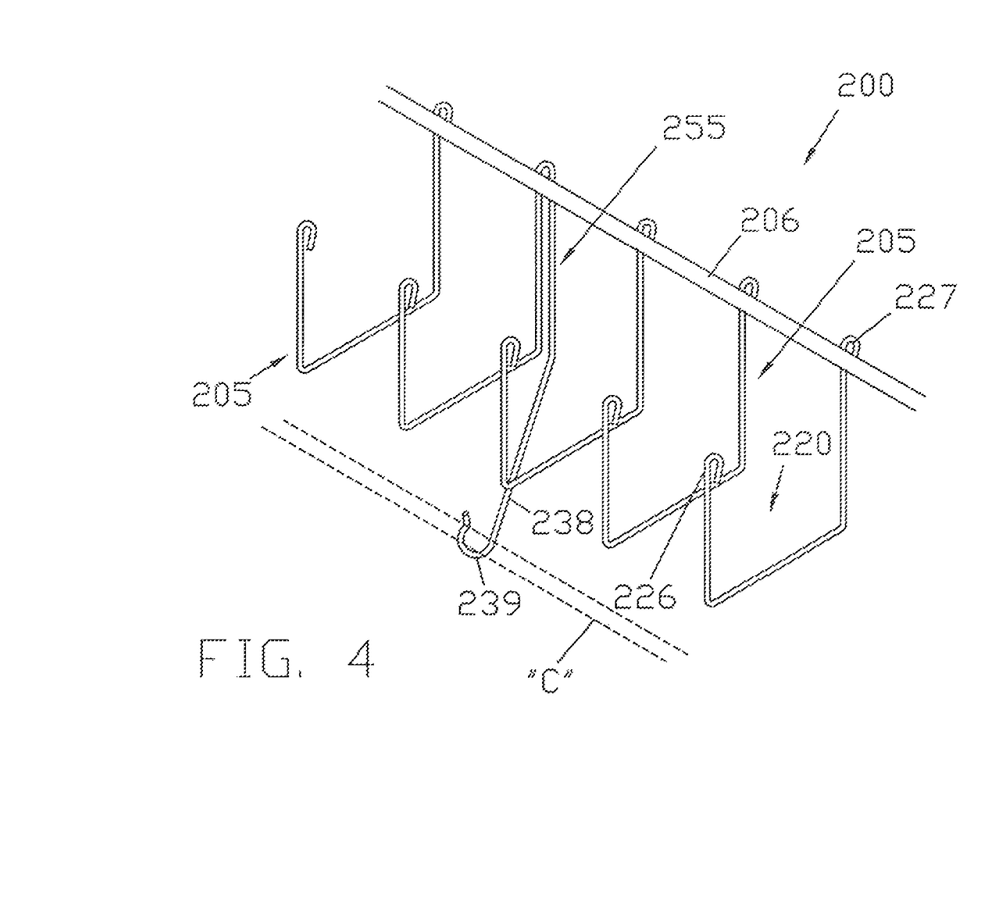
FIG. 4 is an enlarged sectional view of the cable management system of FIG. 3.
Figure 5:
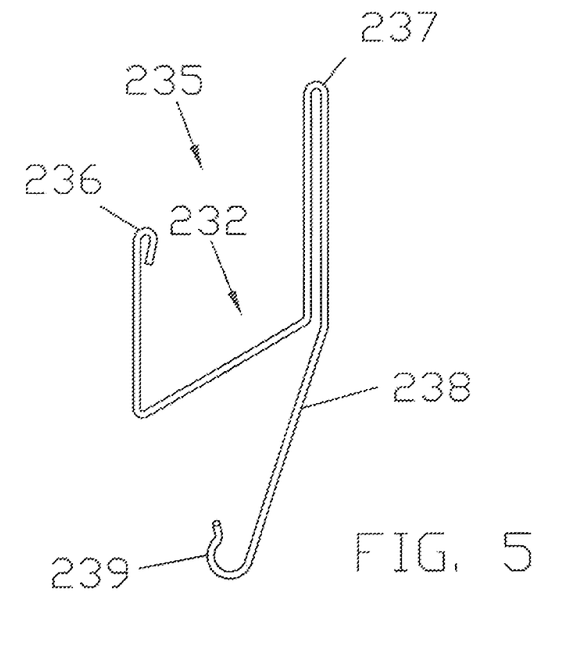
FIG. 5 is an enlarged perspective view of a modified cable support member of the cable management system of FIGS. 3 and 4.
Figure 6:
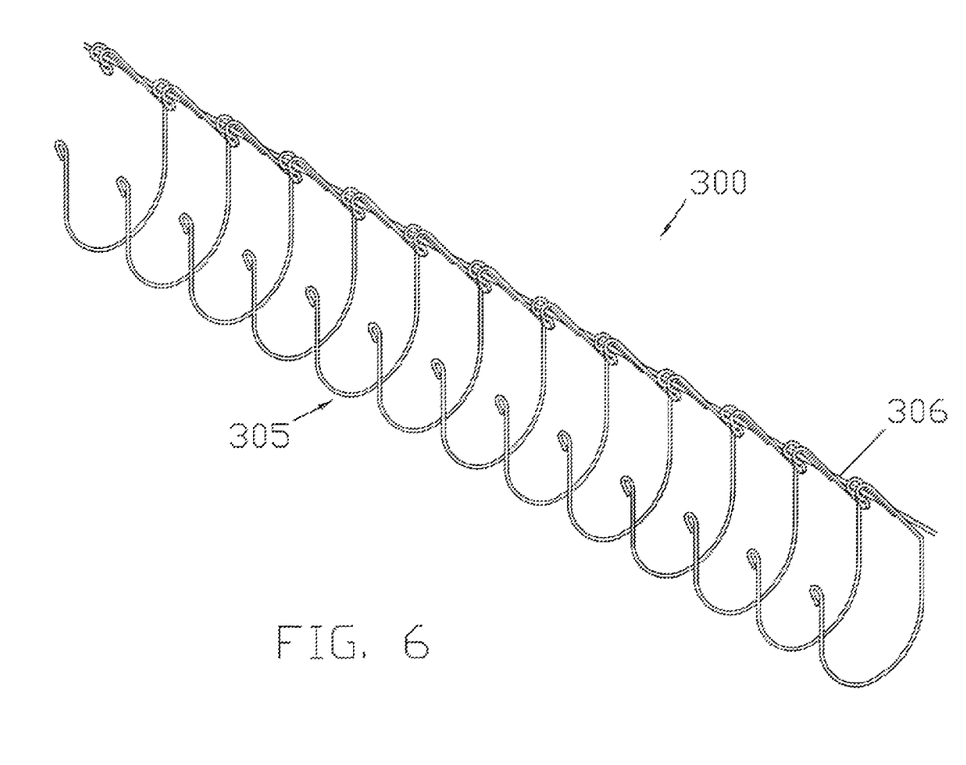
FIG. 6 is a perspective view of a cable management system according to another embodiment of the present disclosure.
Figure 7:
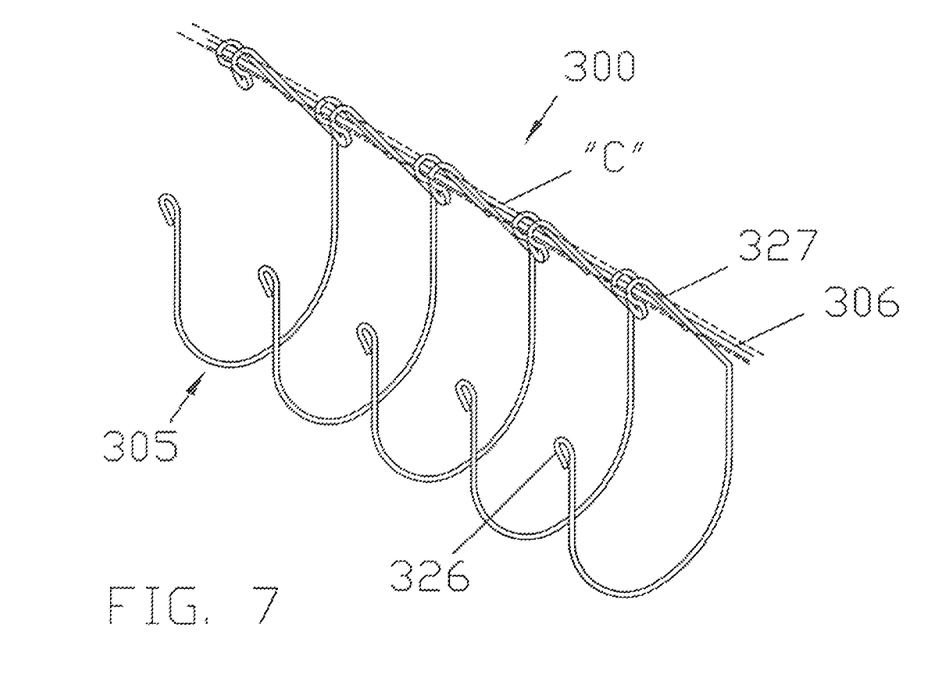
FIG. 7 is an enlarged sectional view of the cable management system of FIG. 6.

Referring now to FIGS. 3-5, a first embodiment of the cable management system of the present disclosure is shown generally as cable tray 200. Cable tray 200 is substantially similar to cable tray 100, and will be described in detail as it relates to the differences therebetween. A flexible spine 206 runs along the length of cable tray 200. Spine 206 may be sized and constructed so as to be bent by hand. Cable support members 205 are laterally spaced along spine 206. Cable support members 205 are substantially similar to cable support members 105. Cable support members 205 include mounting loops 227 and looped ends 226 and define cable receiving portions 220. Mounting loops 227 are configured to secure cable support members 205 to spine 206. As described above with reference to cable tray 100, mounting loops 227 create double attachment points for the attachment of cable support members 205 to spine 206. Looped ends 226 are formed facing inwardly to provide a cable retention feature. Alternatively, looped ends 226 may be formed facing outwardly.

Still referring to FIGS. 3-5, cable tray 200 further includes modified cable support members 235. Modified cable support members 235 are spaced at intervals along spine 206 and are configured to retain one or more cables away from cable receiving portions 220 of cable support members 205. As shown in FIG. 3, modified cable support members 235 are attached to spine 206 in place of every tenth cable support members 205. It is envisioned, however, that modified cable support members 235 may be inserted more or less frequently along spine 206.

With particular reference to FIG. 5, modified cable support member 235 is substantially similar to cable support member 205 (FIGS. 3 and 4). Each modified cable support member 235 defines a cable receiving portion 232 corresponding substantially to cable receiving portions 220 of cable support members 205. Cable support member 235 further includes a mounting loop 237 and a looped end 236. Mounting loop 237 includes an extension or hanger 238 extending therefrom for supporting one or more cables "C" (shown in phantom) separate from cables (not shown) maintained in cable receiving portions 232. Hanger 238 extends below cable receiving portion 232 and includes a hook 239 for retaining one or more cables. In this manner, modified cable support member 235 may maintain one or more cables separate from cable receiving portion 232.

Referring now to FIGS. 6-8B, a second embodiment of a cable management system of the present disclosure is shown generally as cable tray 300. Cable tray 300 includes cable support members 305 laterally spaced along a spine 306. Spine 306 may be sized and constructed so as to be bent by hand. Cable tray 300 is configured to be suspended from one or more cables or other suitable structures.

Figure 8A:
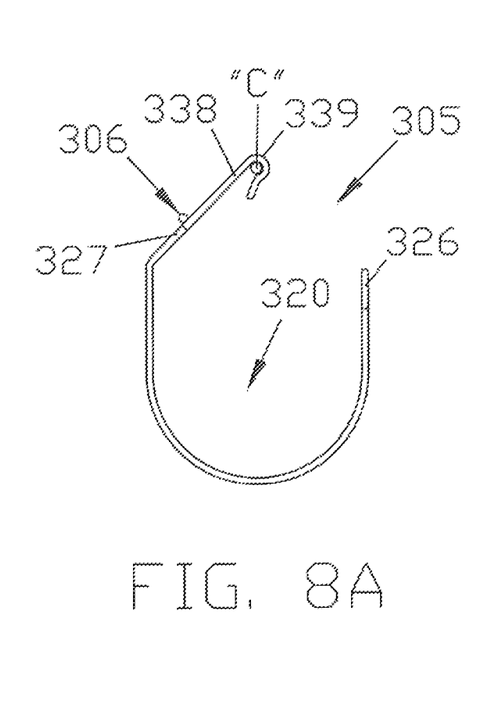
FIG. 8A is an enlarged side view of a cable support member of the cable management system of FIGS. 6 and 7.
Figure 8B:
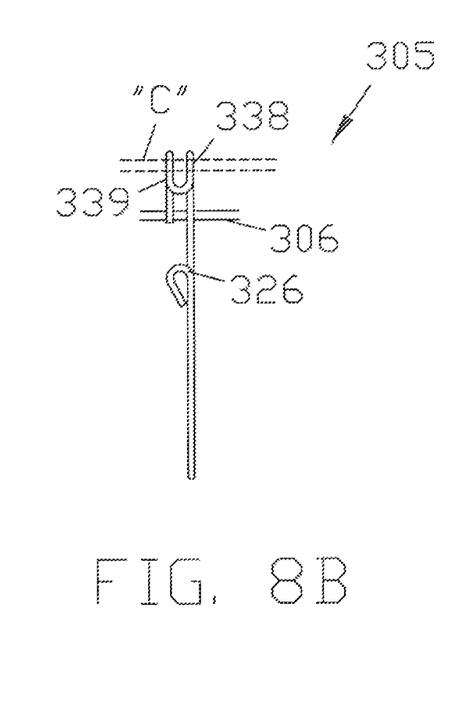
FIG. 8B is an enlarged front view of the cable support member of FIG. 8A.

With particular reference to FIGS. 8A and 8B, each cable support member 305 includes a mounting loop 327 and a looped end 326. Cable support member 305 further includes a cable receiving portion 320. Although shown as a substantially U-shaped region, cable receiving portion 320 may define any suitable geometric shape. Looped ends 326 are formed facing laterally (e.g., in a place that is substantially parallel to an axis of spine 306), however, it is envisioned that looped ends may be formed facing inwardly to provide a cable retention feature.

Still referring to FIGS. 8A and 8B, mounting loop 327 is configured to secure cable support member 305 to spine 306 at two attachment points, as discussed above. Mounting loop 327 is further configured to include an extension or hanger 338. As seen in FIGS. 8A and 8B, hanger 338 extends away from cable receiving portion 320. Hanger 338 includes a hook 339 configured to be suspended from one or more support cables "C" (shown in phantom) or other suitable structure. Preferably, hanger 338 is configured such that hook 339 is disposed in alignment with the center of gravity of cable support member 305. In this manner, cable support members 305 are balanced when suspend from a support cable "C" (shown in phantom) and as cables (not shown) are received within cable receiving portions 320. It is envisioned, however, that hanger 338 may be lengthened or shortened to adjust the balance of cable tray 300.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure as defined by the appended claims.

What is claimed is:

1. A cable support apparatus, which comprises:
an elongate flexible spine member; and
a plurality of support members attached to the elongate flexible spine member, each of the support members formed from a single piece of wire stock and defining a cable receiving portion configured and dimensioned to receive a plurality of cables therein, at least one of the support members defining a first configuration, wherein each of the at least one support members of the first configuration includes:
a first segment extending from a first end of the piece of wire stock and defining a first side of the cable receiving portion;
a second segment extending from the first segment and defining a bottom of the cable receiving portion;

a third segment extending from the second segment and defining a second side of the cable receiving portion; and a mounting loop extending from the third segment, the mounting loop secured to the elongate flexible spine member; and a hanger extending from the mounting loop and defining a hook at a second end of the piece of wire stock, the hook positioned offset relative to the cable receiving portion and configured and dimensioned to receive at least one cable therein.

2. The cable support apparatus according to claim 1, wherein a looped end is defined at the first end of the piece of wire stock.

3. The cable receiving portion according to claim 1, wherein a first opening is defined between the first and third segments, the first opening configured to permit loading or unloading of at least one cable into the cable receiving portion.

4. The cable support apparatus according to claim 1, wherein the hook defines a second opening offset a vertical distance relative to the cable receiving portion, the second opening configured to permit loading or unloading of at least one cable into the hook.

5. The cable support apparatus according to claim 1, wherein the mounting loop is secured to the elongate flexible spine member at two positions, the two positions being axially-spaced along the elongate flexible spine member.

6. The cable support apparatus according to claim 1, wherein the hanger includes a first hanger segment that extends from the mounting loop and a second hanger segment that extends from the first hanger segment to the hook, and wherein the second hanger segment is angled relative to the first hanger segment.

7. The cable support apparatus according to claim 6, wherein the first hanger segment extends in parallel orientation relative to the third segment.

8. The cable support apparatus according to claim 1, wherein the mounting loop is configured to receive mounting hardware for suspending the cable support apparatus from a support structure.

9. The cable support apparatus according to claim 1, wherein the hook is offset relative to the elongate flexible spine member in at least two directions.

10. The cable support apparatus according to claim 1, wherein at least one of the support members of the plurality of support members defines a second configuration different from the first configuration, wherein each of the at least one support members of the second configuration includes:

a first segment extending from a first end of the piece of wire stock and defining a first side of the cable receiving portion;

a second segment extending from the first segment and defining a bottom of the cable receiving portion;

a third segment extending from the second segment and defining a second side of the cable receiving portion; and a mounting loop disposed at a second end of the piece of wire stock.

11. The cable support apparatus according to claim 1, wherein a plurality of support members of the second configuration are attached to the elongate flexible spine member and wherein a plurality of support members of the first configuration are attached to the elongate flexible spine member, the plurality of support members of the first and second configurations arranged to define a repetitive pattern extending along the elongate flexible spine member.

* * * * *